Jan. 23, 1940.   A. GOTTSCHALK ET AL   2,188,079
RECTIFIER DEVICE
Filed May 25, 1938

Inventors:
Albert Gottschalk
Albrecht Geisselsöder
by
Attorney

Patented Jan. 23, 1940

2,188,079

UNITED STATES PATENT OFFICE 2,188,079

RECTIFIER DEVICE

Albert Gottschalk and Albrecht Geisselsöder, Berlin, Germany, assignors to C. Lorenz Aktiengesellschaft, Berlin-Tempelhof, Germany, a company Application May 25, 1938, Serial No. 209,972
In Germany May 29, 1937

4 Claims. (Cl. 175—366)

The present invention relates to rectifier devices, and more specifically to dry-rectifiers comprising a plurality of individual units such as metal rectifiers, metal oxide rectifiers or sulphide rectifiers.

Rectifier devices adapted to operate at high tensions are generally composed of a given number of similar rectifying units connected in tandem fashion with intermediate members of insulation particularly of annular shape arranged therebetween. As a matter of fact, the material or materials used for manufacturing these intermediate members of insulation frequently involve a shrinking and destroying tendency in response to the temperature augment introduced on account of the rectification action so that after a longer use the column of rectifying units requires readjustment particularly with respect to compressional stresses in cases that the individual units of the rectifier are mounted on a spindle common thereto.

The aforesaid difficulties are avoided according to the present invention which proposes the previously employed material of insulation for making the rectifier unit spacing members to be replaced by a metal or metals, and either to provide thin foils or sheets of insulation between the metallic rectifier units and these metallic members, or to employ a metal or metals, the superficies of which consists of a rigid and nonconductive material. Such spacing members may, by way of an example, consist of aluminium the superficies of which has been oxidized.

Figure 1:
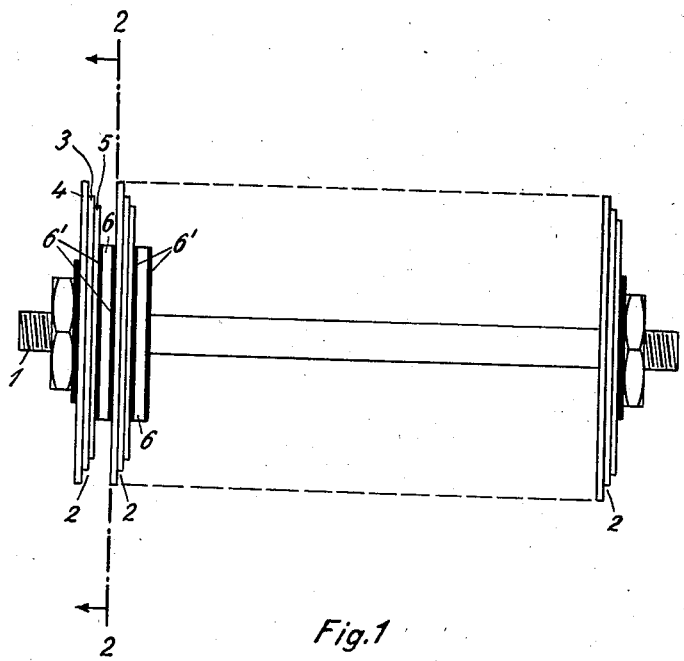
Figure 2:
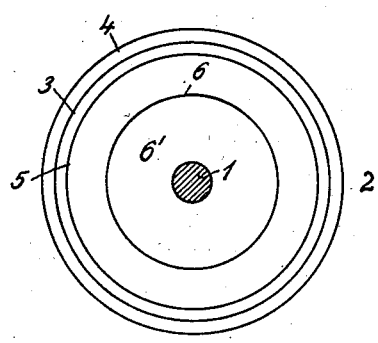

The invention will be more readily understood from the following explanation in conjunction with the accompanying drawing, Figs. 1 and 2 of which are respectively a side elevation and an end elevation of one embodiment according to the invention. The rectifier device comprises a plurality of dry-rectifying units each of which is generally designated as 2. Each of these elements which are arranged one above the other on a spindle 1 common thereto may, for instance, consist of a layer 3 of selenium applied on an iron plate 4 and having its outer surface covered by a conductive electrode 5. The interspace between the individual rectifying units 2 is given by the width of a metal ring 6 which is electrically insulated from the metallic portions of the adjacent rectifying unit by means of a layer of insulation 6'.

The metal rings 6 may be provided with a large groove on one side in order to increase the leakage path.

What is claimed is:

1. A multi-unit dry-rectifier device comprising a plurality of individual rectifier units, intermediate members of metal arranged between each two of said rectifier units and adapted to provide a given space therebetween, and thin layers of insulation for electrically separating said rectifier units and said members of metal.

2. A multi-unit dry-rectifier device comprising a plurality of individual rectifier units, intermediate annular members of metal arranged between each two of said rectifier units and adapted to provide a given space therebetween, and thin layers of insulation for electrically separating said rectifier units and said members of metal.

3. A multi-unit dry-rectifier device comprising a plurality of individual rectifier units, intermediate annular members of aluminium arranged between each two of said rectifier units and adapted to provide a given space therebetween, and thin layers of insulation for electrically separating said rectifier units and said members of metal, said layers being provided on the superficies of said members by oxidation.

4. A multi-unit dry-rectifier device as defined in claim 2, in which one side of said annular members of metal is provided with a groove.

ALBERT GOTTSCHALK.
ALBRECHT GEISSELSÖDER.